United States Patent [19]

Swenson et al.

[11] Patent Number: 5,606,711
[45] Date of Patent: Feb. 25, 1997

[54] APPARATUS AND METHOD FOR PROVIDING MULTIPLE OUTPUT SIGNALS FROM A SINGLE PROGRAMMING LINE GROUP

[75] Inventors: John A. Swenson; Dale R. Anderson, both of Fort Worth, Tex.

[73] Assignee: Motorola, Inc., Schaumburg, Ill.

[21] Appl. No.: 376,479

[22] Filed: Jan. 20, 1995

Related U.S. Application Data

[63] Continuation of Ser. No. 903,299, Jun. 24, 1992, abandoned.

[51] Int. Cl.$^6$ ..................................................... G06F 1/02
[52] U.S. Cl. ............................. 395/800; 455/76; 364/718
[58] Field of Search .............................. 395/800; 455/76; 364/718

[56] References Cited

U.S. PATENT DOCUMENTS

| | | | |
|---|---|---|---|
| 3,705,385 | 12/1972 | Batz | 340/870.02 |
| 4,449,105 | 5/1984 | Frank et al. | 331/3 |
| 5,025,414 | 6/1991 | Iwamoto | 395/650 |
| 5,140,540 | 8/1992 | Cheney et al. | 364/718 |
| 5,257,409 | 10/1993 | Sarocka et al. | 455/76 |

*Primary Examiner*—Alyssa H. Bowler
*Assistant Examiner*—John Harrity
*Attorney, Agent, or Firm*—Kevin A. Buford; Jeffrey G. Toler

[57] ABSTRACT

An apparatus (100) utilizes a shift register (107) to select which of multiple synthesizers (115, 117) is to receive programming information. This allows multiple synthesizers (115, 117) to be programmed based on input from a single programing line group (102). The number of devices that can be programmed is limited by the number of parallel outputs available from the shift register (107).

8 Claims, 3 Drawing Sheets

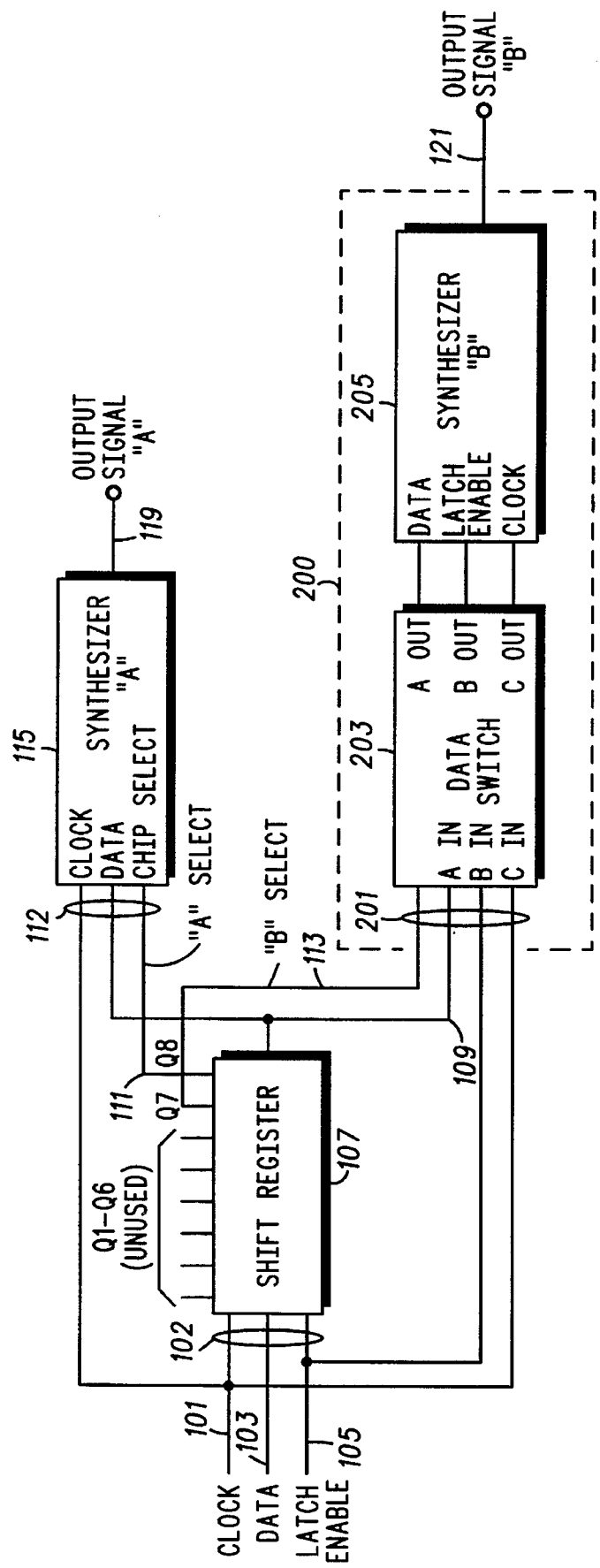

APPARATUS AND METHOD FOR PROVIDING MULTIPLE OUTPUT SIGNALS FROM A SINGLE PROGRAMMING LINE GROUP

This is a continuation of application Ser. No. 07/903,299, filed Jun. 24, 1992 and now abandoned.

FIELD OF THE INVENTION

This invention relates generally to programmable synthesizers and more specifically to programming of multiple synthesizers via reduced programming lines.

BACKGROUND OF THE INVENTION

The use of programmable synthesizers in communication systems, more specifically cellular radiotelephone systems, is well known. As these cellular radiotelephone systems develop, however, the circuit complexity and cost is continuously increasing. More advanced cellular radiotelephone systems, for example, time-division multiple access (TDMA) cellular radiotelephone systems and code-division multiple access (CDMA) cellular radiotelephone systems require radio transceivers (a combination transmitter/receiver) which incorporate frequency agile programmable synthesizers. Since transceivers in these TDMA and CDMA systems are limited in their agility by the lock-time of the programmable synthesizer, an easy and efficient alternative to frequency agility is to provide multiple programmable synthesizers per transceiver.

Typically, for each programmable synthesizer, three programming lines are used: CLOCK, DATA, and LATCH ENABLE (or CHIP SELECT). For each additional programmable synthesizer used, additional programming lines, or line groups, are normally required. However, as the number of programmable synthesizers increases, so does the circuit complexity for interfacing between adjacent microprocessors and these programmable synthesizers.

Thus, a need exists for an apparatus and method which allows for the addition of programmable synthesizers in a transceiver while mitigating circuit complexity.

SUMMARY OF THE INVENTION

An apparatus provides multiple output signals and comprises first and second means for generating a first and second output signals based on input from respective first and second programming line groups and means, coupled to the first and second means for generating via the first and second programming line groups, for selecting generation of either the first or second output signals based on input from a single programming line group.

BRIEF DESCRIPTION OF THE DRAWINGS

FIG. 2 generally depicts, in block diagram form, an alternate embodiment of an apparatus which provides multiple output signals from a single programming line group in accordance with the invention.

DETAILED DESCRIPTION OF A PREFERRED EMBODIMENT

Figure 1:
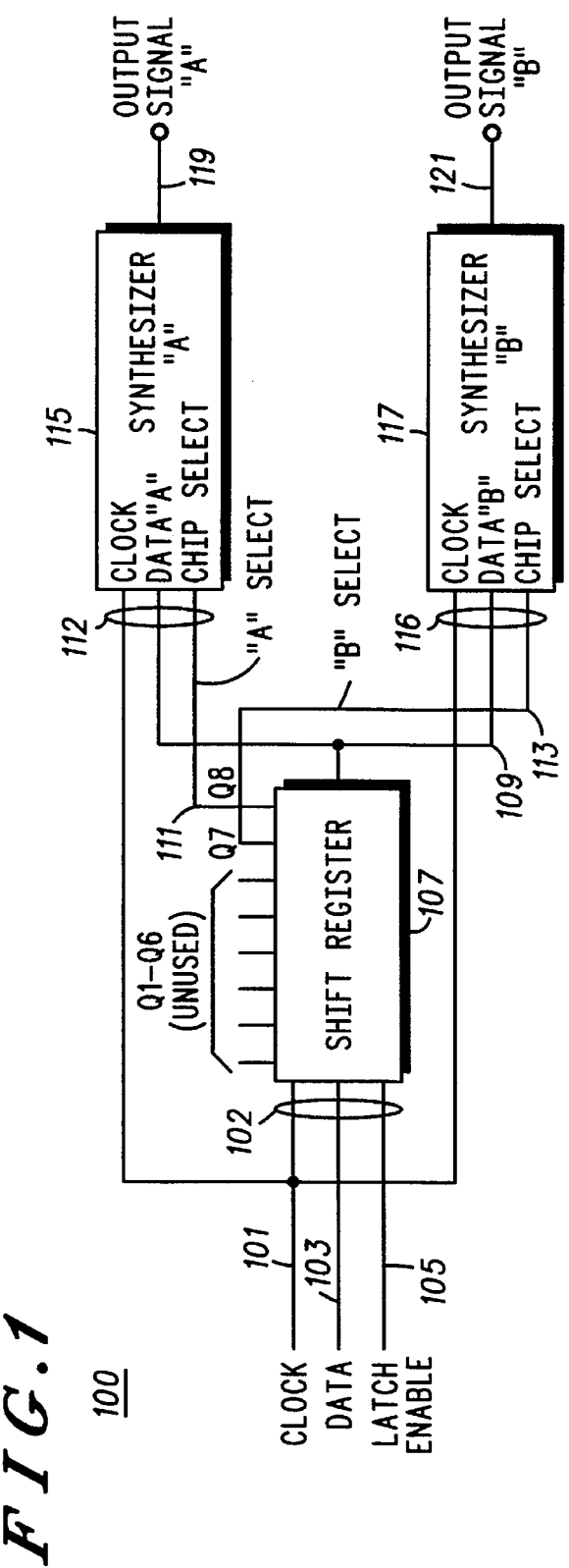
FIG. 1 generally depicts, in block diagram form, an apparatus which provides multiple output signals from a single programming line group in accordance with the invention.

FIG. 1 generally depicts, in block diagram form, an apparatus 100 which provides multiple output signals 119, 121 from a single programming line group 102 in accordance with the invention. Apparatus 100 utilizes means for selecting, which in the preferred embodiment is a shift register 107, to select generation of either said first or second output signals 119, 121 based on input from a single programming line group 102. Apparatus 100 also utilizes first and second means for generating, which in the preferred embodiment are synthesizer "A" 115 and synthesizer "B" 117. Synthesizers 115, 117 generate first and second output signals, signal "A" 119 and signal "B" 121, based on input from respective first and second programming line groups 112, 116. Shift register 107 selects which synthesizer 115, 117 is to receive programming information from single programming line group 102. This allows multiple synthesizers 115, 117 to be programmed by single programming line group 102.

The programming information from DATA line 103 is routed serially through shift register 107, and then to synthesizers 115, 117 via line QS* 109. The parallel outputs Q1–Q8 of shift register 107 control which synthesizer 115, 117 is enabled to receive the programming information from line QS* 109 of shift register 107. As depicted in FIG. 1, parallel outputs Q1–Q6 are unused.

In the preferred embodiment, synthesizers 115, 117 incorporate a CHIP SELECT line from programming line groups 112, 116. In this type of synthesizer, the synthesizer will only receive programming information when the CHIP SELECT line is asserted. As can be seen in FIG. 1, parallel outputs Q7 and Q8 are coupled to the CHIP SELECT input of synthesizers 117, 115 respectively. When a parallel output line Q7 or Q8 of shift register 107 is asserted, the corresponding synthesizer 117, 115 receives programming data via line QS* 109. This programming will be maintained until parallel outputs Q7 or Q8 is de-asserted.

Programming information from the DATA line is shifted out of shift register 107 on an output that changes state on a falling edge of CLOCK signal 101, rather than the rising edge of CLOCK signal 101. This is to prevent a race state that would otherwise occur. Synthesizers 115, 117 would see a rising edge of CLOCK signal 101 and a corresponding transition from DATA signal 103 at the same time. In this situation, transition from DATA line 103 may or may not occur before the CLOCK rising edge. Using the falling edge of CLOCK signal 101 on the shift register 107 prevents this situation.

FIG. 2 generally depicts, in block diagram form, an alternate embodiment of an apparatus which provides multiple output signals 119, 121 from a single programming line group 102 in accordance with the invention. The circuitry depicted in FIG. 2 differs from that depicted in FIG. 1 in that synthesizer 205 has a LATCH ENABLE line instead of a CHIP SELECT line as did synthesizer 117 of FIG. 1. To accommodate for the different synthesizer 205, a data switch 203 is employed with synthesizer 205 to comprise a means for generating an output signal. As shown in FIG. 2, LATCH ENABLE line 105 is connected to the data switch 203. Also input into data switch 203 is "B" select line 113 which is parallel output Q7 of shift register 107. In this embodiment, line 113 acts as a CHIP SELECT line. For synthesizer 205, which has a LATCH ENABLE line (i.e., it always accepts programming information regardless of the state of the LATCH ENABLE line, but the information is latched into the internal register only when a rising edge occurs on that line), data switch 203 must be employed. This allows shift register 107 to treat means for generating 200 as if it had a CHIP SELECT line. All three lines 101, 105, 109 through the data switch 203 are open together, or closed together, as controlled by the corresponding output Q7 of shift register 107.

Figure 3:
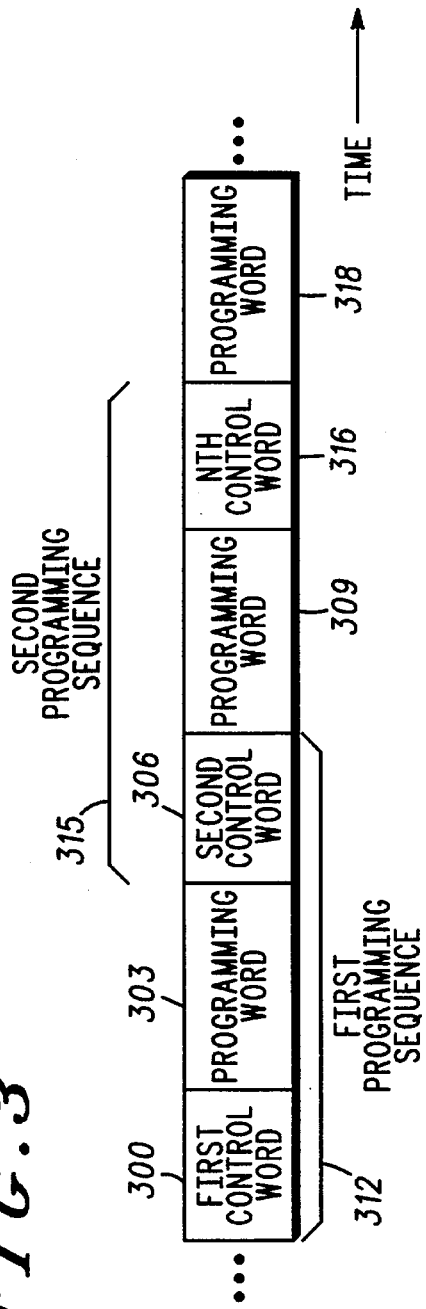
FIG. 3 generally depicts programming sequences on the DATA line in accordance with the invention.

FIG. 3 generally depicts programming sequences on DATA line 103 in accordance with the invention. A first control word 300, which in the preferred embodiment is an 8-bit control word, enters shift register 107 and is used to initialize outputs Q1–Q8 of shift register 107. When initialized, shift register 107 has only one output Q1–Q8 asserted (i.e., a selected programmable synthesizer), based on the bit configuration of control word 300. After control word 300 is latched into shift register 107 by a toggle on latch enable line 105, programming word 303 is sent to the selected programmable synthesizer based on the bit configuration of control word 300. After programming word 303 is sent, a second control word 306 is utilized to latch programming word 303 into the selected programmable synthesizer. Second control word 306, in effect, pushes the data of programming word 303 through shift register 107 to the selected programmable synthesizer and, in the preferred embodiment, is an 8-bit control word. When implemented together, first control word 300, programming word 303, and second control word 306 comprise first programming sequence 312.

When second programming sequence 315 begins, second control word 306 serves a second purpose in that it is the first control word of second programming sequence 315. Although depicted as second control word 306 in FIG. 3, second control word 306 will re-initialize outputs Q1–Q8 of shift register 107 to start second programming sequence 315. After second control word 306 (or any control word) re-initializes shift register 107, second control word 306 is latched into shift register 107 via a toggle on latch enable line 105. This toggle on latch enable line 105 also latches the programming word into the selected programmable synthesizer. After the toggle, programming word 309 is sent to the selected programmable synthesizer based on the bit configuration of second control word 306.

Programming words utilized in the preferred embodiment may be of any bit length. Since all programming words are followed by an 8-bit control word, which is latched into shift register 107 by a toggle on latch enable line 105, shift register 107 need not keep track, or count, the number of bits that flow through it. After programming word 309 is sent, an $N^{th}$ control word 316 is sent, and a toggle on latch enable line 105 again occurs to both latch the data of programming word 309 into the selected programmable synthesizer and re-initialize outputs Q1–Q8 of shift register 107 based on the bit configuration of $N^{th}$ control word 316. As is apparent from FIG. 3, $N^{th}$ control word 316 would be the second control word of second programming sequence 315 and the first control word of a subsequent (in this case, a third) programming sequence (not shown). If two successive programming words, for example programming words 303, 309, are required to program one synthesizer, it should be clear to one of ordinary skill in the art that the bit configuration of first control word 300 would be equal to the bit configuration of second control word 306.

Figure 4:
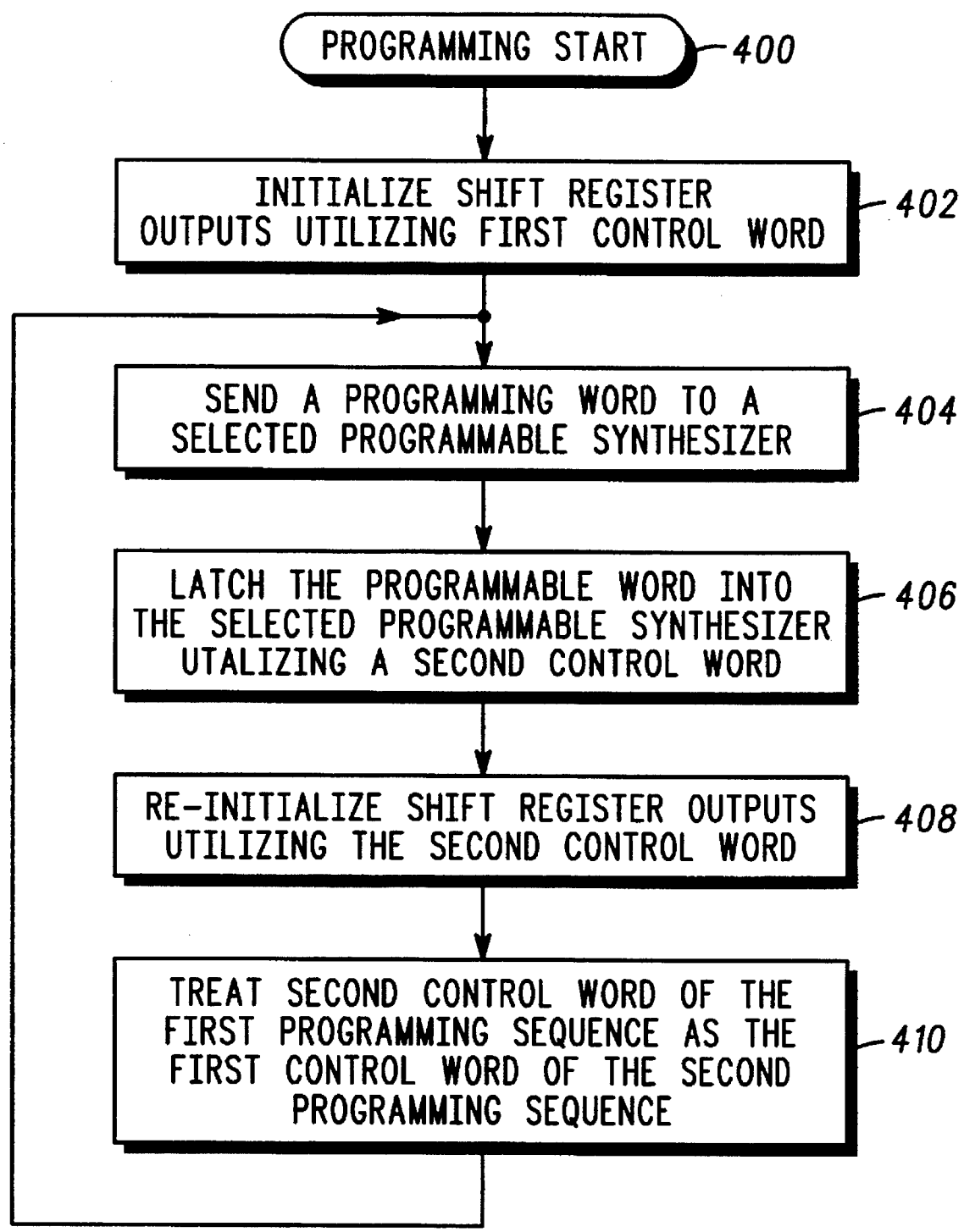
FIG. 4 generally depicts a flow chart which describes a typical synthesizer programming scenario in accordance with the invention.

FIG. 4 generally depicts a flow chart which describes a typical synthesizer programming scenario in accordance with the invention. Programming starts at step 400 by initializing shift register 107 outputs Q1–Q8 at step 402 utilizing a first control word 300 so that data is routed to a selected programmable synthesizer. Next, programming word 303 for the selected synthesizer is sent at step 404. Programming word 303 is then latched into the selected programmable synthesizer at step 406 utilizing second control word 306. Second control word 306 also re-initializes shift register 107 at step 408. After re-initialization, second control word 306 of first programming sequence 312 is treated at step 410 as the first control word of the second programming sequence 315. A next programming word 309 is then sent at step 404, followed by the corresponding second control word (in this example, $N^{th}$ control word 316) for second programming sequence 315. Steps 404, 406, and 408 are repeated as required to generate the first and second output signals.

The inventive apparatus depicted in FIG. 1 and FIG. 2 is especially well suited for a communication systems such as cellular radiotelephone systems. With respect to analog cellular radiotelephone systems, such as the advanced mobile phone system (AMPS) and the narrow band advanced mobile phone system (NAMPS), the inventive apparatus depicted in FIG. 1 and FIG. 2 can be used where synthesizers are required in transceivers for driving mixers during RF/IF, IF/base band conversion and vice versa. With respect to digital cellular radiotelephone systems, such as a time-division multiple access (TDMA) cellular radiotelephone system and a code-division multiple access (CDMA) cellular radiotelephone system, which require frequency agile transmission/reception, the inventive apparatus depicted in FIG. 1 and FIG. 2 can be used for alternating frequencies per timeslots of a TDMA cellular radiotelephone system or alternating frequency-hops in a CDMA cellular radiotelephone system. In either event, the inventive apparatus may be beneficially employed in any communication system configuration where multiple synthesizers may be useful, or required.

Thus, it will be apparent to one skilled in the art that there has been provided in accordance with the invention a apparatus and method for providing a multiple output signals from a single programming line group that fully satisfies the objects, aims and advantages set forth above.

While the invention has been described in conjunction with specific embodiments thereof, it is evident that many alterations, modifications, and variations will be apparent to those skilled in the art in light of the foregoing description. Accordingly, it is intended to embrace all such alterations, modifications, and variations in the appended claims.

What we claim is:

1. A method of programming an apparatus to provide multiple output signals from a single programming line group, the apparatus having a shift register having the single programming line group as an input and first and second programming line groups as outputs, the first and second programming line groups being input into first and second programmable synthesizers for generation of first and second output signals, said shift register including a first input receiving a clock signal and a second input receiving a data signal, said shift register producing a first output to select said first programmable synthesizer, a second output to select said second programmable synthesizer, and a third output transmitting programming data responsive to said data signal to program the selected programmable synthesizer, said first programming line group comprising said clocking signal and a first data signal and said second programming line group comprising said clocking signal and a second data signal, the method comprised of the steps of:

initializing the outputs of the shift register utilizing a first control word;

sending a programming word to a selected one of the first and second programmable synthesizers responsive to the outputs of the shift register;

loading a second control word into the shift register;

latching said programming word into said selected programmable synthesizer following the loading of the second control word; and re-initializing said outputs of the shift register utilizing said second control word.

2. The method of claim 1 wherein said step of initializing further comprises:

shifting said first control word from the single programming line group into the shift register; and latching said first control word into the shift register to select a programmable synthesizer based on said first control word.

3. The method of claim 1 wherein said first control word and second control word are equivalent.

4. The method of claim 1 wherein said steps of sending, latching, and re-initializing are repeated as required to generate the first and second output signals.

5. The method of claim 1, wherein one of said first and second programmable synthesizers further comprises a select signal.

6. The method of claim 1, wherein said shift register is serially coupled to said first and second programmable synthesizers.

7. The method of claim 1, wherein said shift register is coupled in parallel to said first and second programmable synthesizers.

8. An apparatus for programming an apparatus to provide multiple output signals from a single programming line group, the apparatus having a shift register having the single programming line group as an input and first and second programming line groups as outputs, the first and second programming line groups being input into first and second programmable synthesizers for generation of first and second output signals, said shift register including a first input receiving a clock signal and a second input receiving a data signal, said shift register producing a first output to select said first programmable synthesizer, a second output to select said second programmable synthesizer, and a third output transmitting programming data responsive to said data signal to program the selected programmable synthesizer, said first programming line group comprising said clocking signal and a first data signal and said second programming line group comprising said clocking signal and a second data signal, the apparatus comprising:

the outputs of the shift register initialized utilizing a first control word;

the shift register sending a programming word to a selected one of the first and second programmable synthesizers responsive to the outputs of the shift register;

means for loading a second control word into the shift register;

said selected programmable synthesizer having latched therein said programming word following the loading of the second control word; and the outputs of the shift register re-initialized utilizing said second control word.

* * * * *